United States Patent
Thakar et al.

(10) Patent No.: US 7,488,032 B2
(45) Date of Patent: Feb. 10, 2009

(54) ATTACHMENT JOINT FOR PLASTIC OVER-FENDER TO PLASTIC FASCIA

(75) Inventors: Yogesh Thakar, Farmington Hills, MI (US); Chau Chaay, Farmington Hills, MI (US); Nandkumar Rangnekar, Farmington Hills, MI (US); Richard Eschebach, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/522,728

(22) Filed: Sep. 18, 2006

(65) Prior Publication Data

US 2008/0067837 A1     Mar. 20, 2008

(51) Int. Cl.
*B62D 25/08* (2006.01)
(52) U.S. Cl. .................... 296/198; 296/191
(58) Field of Classification Search ............ 296/29, 296/191, 198; 293/1, 120, 121, 108, 141, 293/155; 280/768
See application file for complete search history.

(56) References Cited

U.S. PATENT DOCUMENTS

| | | | |
|---|---|---|---|
| 4,875,728 A * | 10/1989 | Copp et al. ................ 296/126 |
| 4,973,102 A * | 11/1990 | Bien ...................... 296/187.01 |
| 5,061,108 A | 10/1991 | Bien et al. | |
| 5,108,138 A * | 4/1992 | Kawaguchi ................ 293/120 |
| 5,226,695 A | 7/1993 | Flint et al. | |
| 5,879,045 A | 3/1999 | Logan | |
| 5,882,054 A * | 3/1999 | Devilliers et al. ........... 293/155 |
| 6,010,169 A * | 1/2000 | Cox et al. .................... 293/120 |
| 6,129,384 A * | 10/2000 | Fischer et al. ............... 280/770 |
| 6,135,517 A * | 10/2000 | Cordebar .................... 293/155 |
| 6,209,940 B1 * | 4/2001 | Jocher et al. ................. 296/29 |
| 6,715,764 B2 * | 4/2004 | Delavalle et al. .............. 276/29 |
| 6,769,727 B2 * | 8/2004 | Delavalle et al. ............. 296/29 |
| 7,144,059 B2 * | 12/2006 | Pfister et al. .................. 296/29 |
| 7,258,383 B2 * | 8/2007 | Pfister et al. .................. 296/29 |

* cited by examiner

*Primary Examiner*—Glenn Dayoan
*Assistant Examiner*—Gregory Blankenship
(74) *Attorney, Agent, or Firm*—Young Basile

(57) ABSTRACT

An attachment joint can provide in combination a plastic over-fender member connectable to a fender of a motor vehicle, a plastic fascia member connectable to a fender, and a complementary attachment coupling located between the over-fender member and the fascia member for interlocking engagement with one another and for holding the over-fender member with respect to the fascia member in at least two directions. The coupling can have a first mating portion molded with the over-fender member and a second mating portion molded with the fascia member. The first and second mating portions can define a hook and slot joint combination.

12 Claims, 5 Drawing Sheets

US 7,488,032 B2

ATTACHMENT JOINT FOR PLASTIC OVER-FENDER TO PLASTIC FASCIA

FIELD OF THE INVENTION

The present invention relates to an attachment joint for controlling fit and finish of a connection between exterior body members of a motor vehicle, and more particularly a hook and slot coupling located between first and second members for interlocking engagement with one another to hold the first and second members with respect to one another in at least two directions.

BACKGROUND

Appearance of exterior parts of a vehicle body make an initial impression on a customer regarding the perceived quality of a vehicle. If the gaps, i.e. fit and finish characteristics, are small, uniform and consistent along all lines, the appearance of the vehicle is improved. Automotive original equipment manufacturers sometimes add plastic over-fenders (flare) on the sides of the vehicle to enhance exterior appearance of the vehicle. Maintaining the consistency within the required fit and finish tolerance zone of various nearby parts can be a time consuming task on an assembly line. Visual inspection by an automotive engineer can find that an over-fender does not properly merge on the fender and also does not blend in well with the fascia. This can result from the lack of an attachment between the fascia and the over-fender parts. Typically, the over-fender is only attached to the fender. This can sometimes lead to gaps occurring outside of desired specifications or vehicle exterior target values. Eventually, the initial impression of the customer with respect to the quality of the vehicle can impact the sales volume of the vehicle. Various attachment joints have been proposed and are known to those skilled in the art, such as U.S. Pat. Nos. 5,879,045; 5,061,108; and 5,226,695. However, the known attachment joints can be difficult to manufacture, difficult to assembly, and/or are not intended for attaching the plastic over-fender to the plastic fascia.

SUMMARY

It would be desirable to provide an attachment joint between two parts with easy assembly. It would be desirable to use molded attachment joint elements in order to eliminate the need for additional fasteners for attaching the plastic over-fender to the plastic fascia. An attachment joint for controlling fit and finish of a connection between exterior body members of a motor vehicle can include a first mating portion located on a first member, and a second mating portion located on the second member, wherein the first and second mating portions define a hook and slot coupling located between the first member and the second member for interlocking engagement with one another for holding the first member with respect to the second member in at least two directions.

A plastic over-fender to plastic fascia attachment for a motor vehicle can include a first mating portion located on an over-fender member, and a second mating portion located on a fascia member, wherein the first and second mating portions define a hook and slot coupling located between the over-fender member and the fascia member for interlocking engagement with one another for holding the over-fender member with respect to the fascia member in at least two directions.

An attachment joint in combination can include a plastic over-fender member connectable to a fender of a motor vehicle, a plastic fascia member connectable to the fender, and a complementary attachment coupling located between the over-fender member and the fascia member for interlocking engagement with one another for holding the over-fender member with respect to the fascia member in at least two directions, the coupling having a first mating portion molded with the over-fender member and a second mating portion molded with the fascia member.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
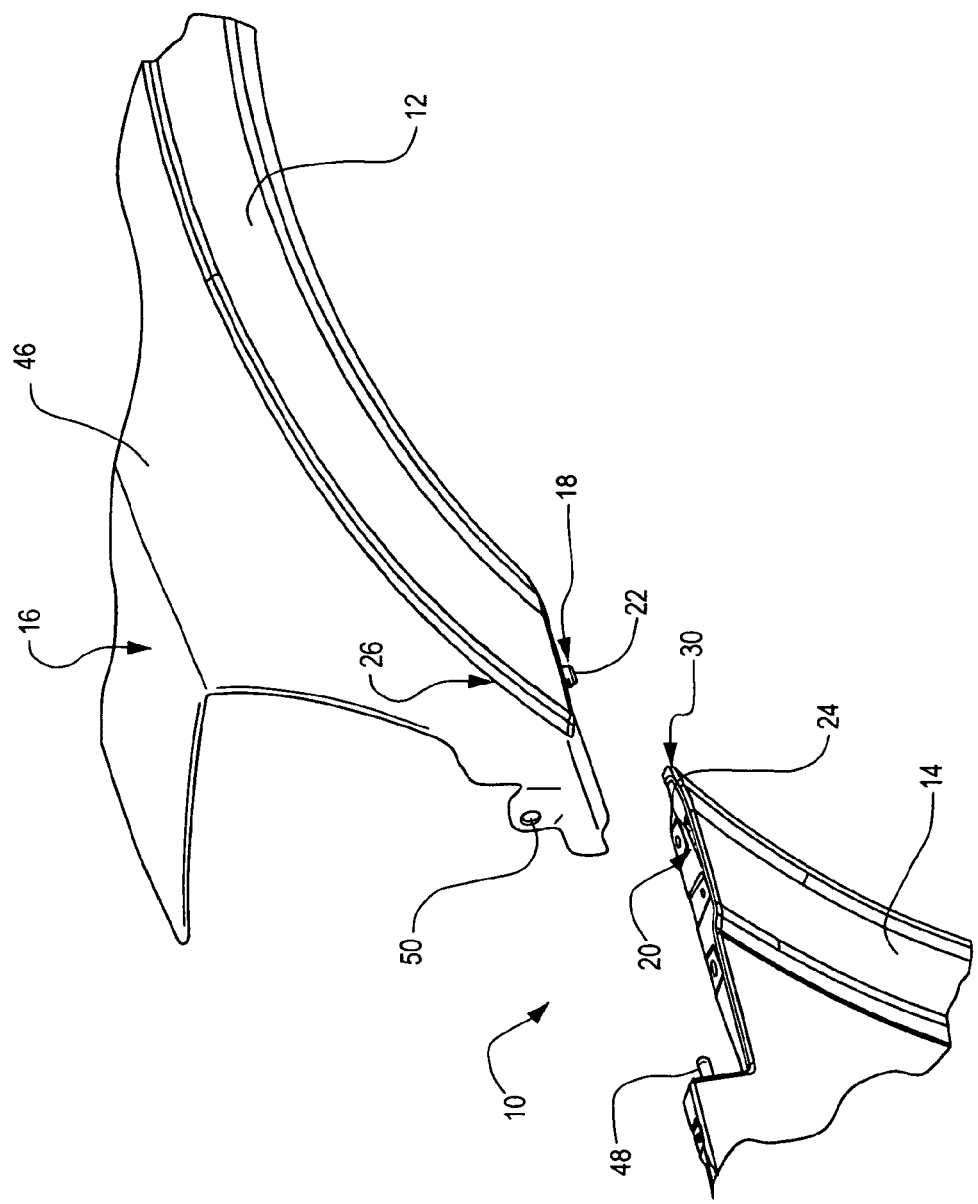
FIG. 1 is a perspective view of exterior body members of a motor vehicle including a fender, an over-fender, and a fascia.
Figure 2:
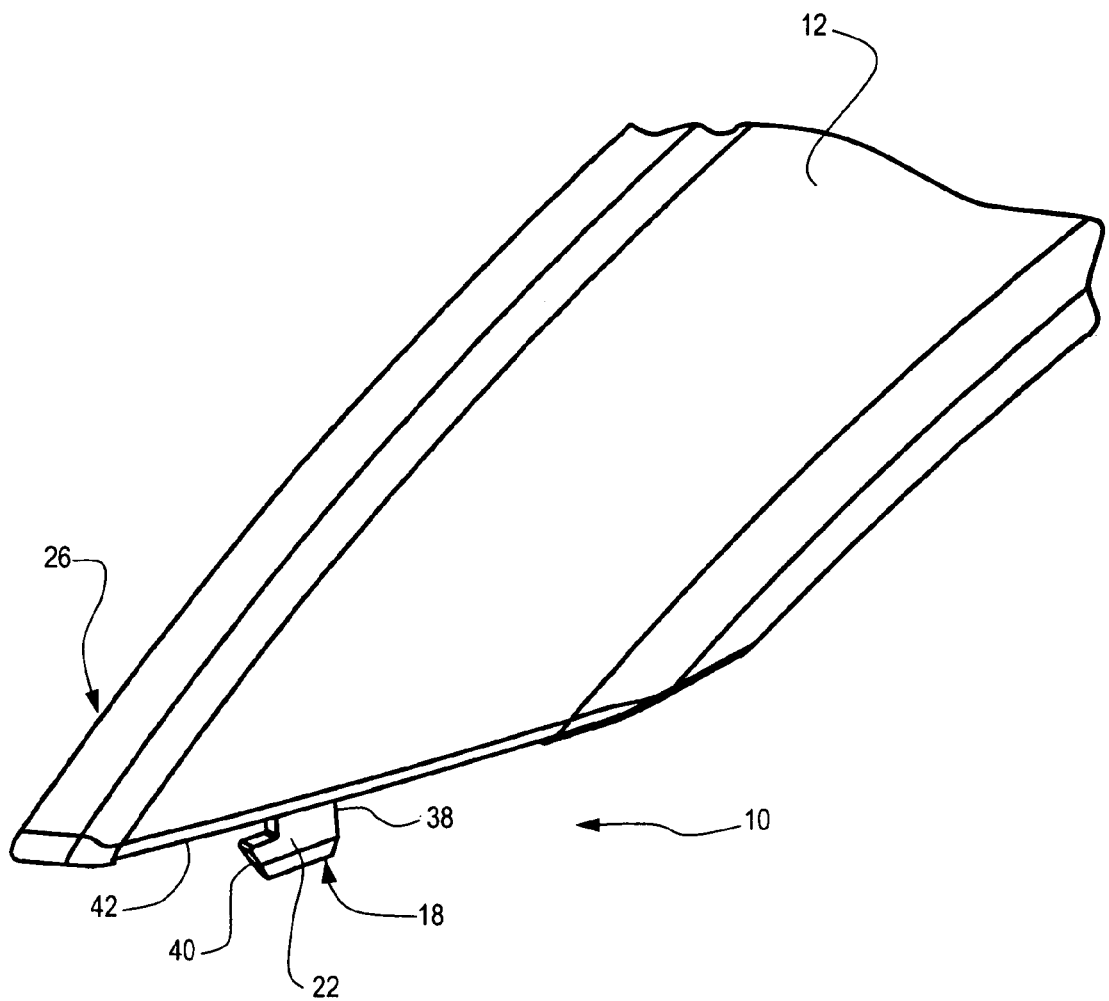
FIG. 2 is a detailed view of a forward portion of an over-fender exterior body member of a motor vehicle having a first mating portion, such as a hook for interlocking engagement with another second mating portion.
Figure 3:
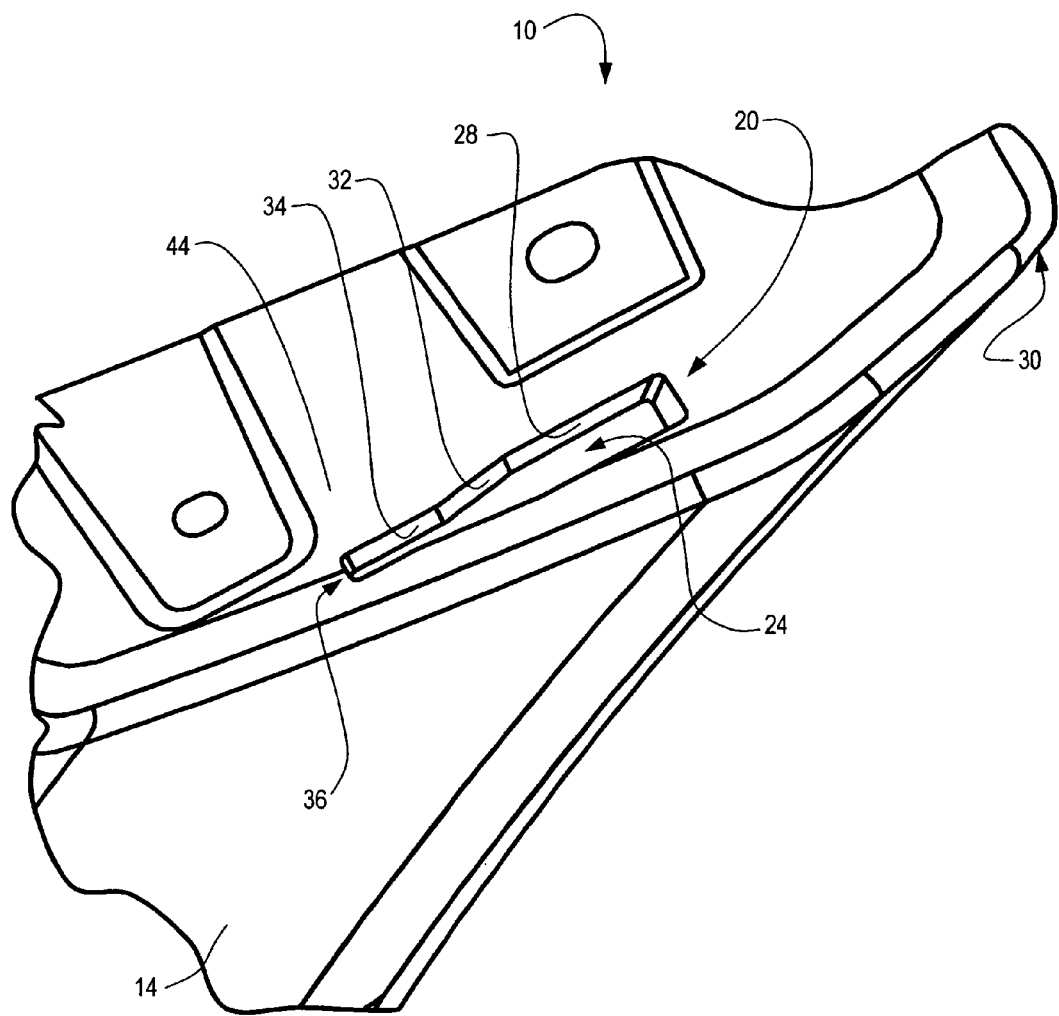
FIG. 3 is a detailed view of a rearward portion of a fascia with a mating portion, such as a slot, for interlocking engagement with another mating portion.

Referring now to FIGS. 1-3, an attachment joint 10 for controlling fit and finish of a connection between exterior body members 12, 14 of a motor vehicle 16 can include a first mating portion 18 located on a first exterior body member 12, and a second mating portion 20 located on a second exterior body member 14. The first and second mating portions 18, 20 can define a hook 22 and slot 24 coupling located between the first member 12 and the second member 14 for interlocking engagement with one another and for holding the first member 12 with respect to the second member 14 in at least two directions. The at least two directions can include a cross-vehicle direction and an up-down vertical direction with respect to the motor vehicle 16. Referring now to FIG. 2, the first member 12 can be an exterior body over-fender member having a forward portion 26. The forward portion 26 can include a first mating portion 18. The first mating portion 18 can define either a hook 22 or slot 24 for coupling with respect to the other complementary mating portion 20. By way of example and not limitation, FIG. 2 illustrates a hook 22. It should be recognized that the illustrated hook 22 could be replaced with a slot 24 (as illustrated in FIG. 3) without departing from the scope of the present invention.

Referring now to FIG. 3, the second member 14 can be an exterior body fascia member. The exterior body fascia member can include a second mating portion 20 for interlocking engagement with another complementary first mating portion 18. By way of example and not limitation, FIG. 3 illustrates the second mating portion 20 as a slot 24. It should be recognized that the slot 24 can be replaced with a hook 22 (as illustrated in FIG. 2) to reverse the hook and slot coupling association between the first and second members 12, 14 without departing from the scope of the present invention. The slot 24 can be closed at both ends, and have an enlarged opening or width adjacent a rearward end 30 of the fascia member 14. The slot 24 can extend forwardly from the enlarged width opening portion 28 through a narrowing transition 32 to a narrowed opening portion 34 adjacent a forward end 36 of the slot 24. The enlarged width opening portion 28 allows easy access and insertion of the hook 22 with respect to the slot 24, such that relative motion between the hook 22 and slot 24 can direct the hook 22 through the narrowing transitioning 32 into the narrowed opening portion 34. Referring again to FIG. 2, hook 22 can include a support base or neck portion 38 and a protruding engagement barb or tab 40 adjacent an outer end of the neck 38. The protruding barb or tab 40 defines a predetermined dimension between the protruding barb 40 and the opposing wall 42 of the first exterior body member 12. The predetermined dimension is sufficiently large to trap a retaining wall 44 of the second exterior body member 14 through which the slot 24 is defined for interlocking engagement to hold the first member 12 with respect to the second member 14 in at least two directions corresponding to a cross-vehicle direction traversing the narrowed opening 34 and an up-down vertical direction in the direction of the neck portion 38 extending through the narrowed opening 34. A third member 46 can be connectable to the first member 12 and the second member 14 to lock the first and second mating portions 18, 20 in a third direction extending perpendicular to the other two directions. By way of example and not limitation, the third direction can extend fore and aft with respect to the vehicle 16. By way of example and not limitation, the third member 46 can be an exterior body fender member of the motor vehicle 16. As best seen in FIG. 1, if desired an alignment pin 48 can be provided with the second exterior body fascia member for engagement within an alignment aperture 50 associated with the third exterior body fender member 46.

Figure 4:
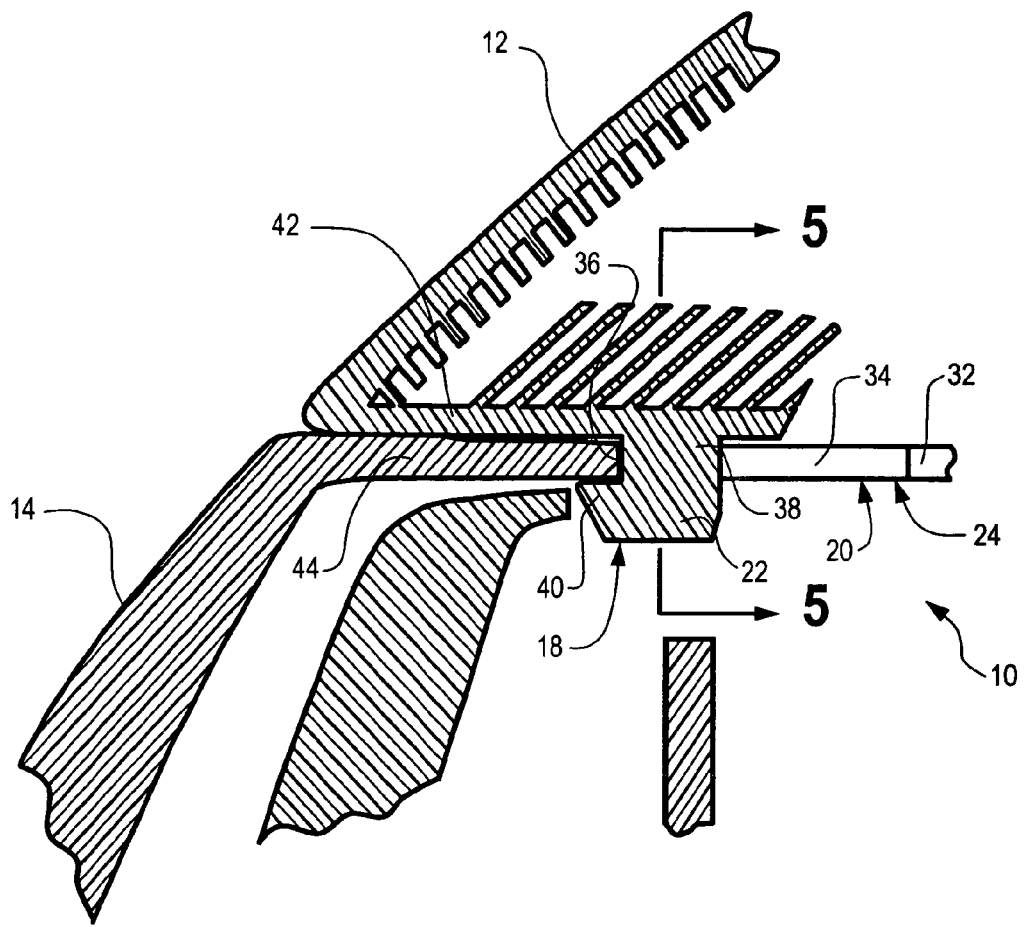
FIG. 4 is a cross-sectional view of an over-fender exterior body member connected to a fascia exterior body member of a motor vehicle with first and second mating portions defined by a hook and slot coupling for interlocking engagement with one another to hold the over-fender and fascia members with respect to one another in at least two directions.
Figure 5:
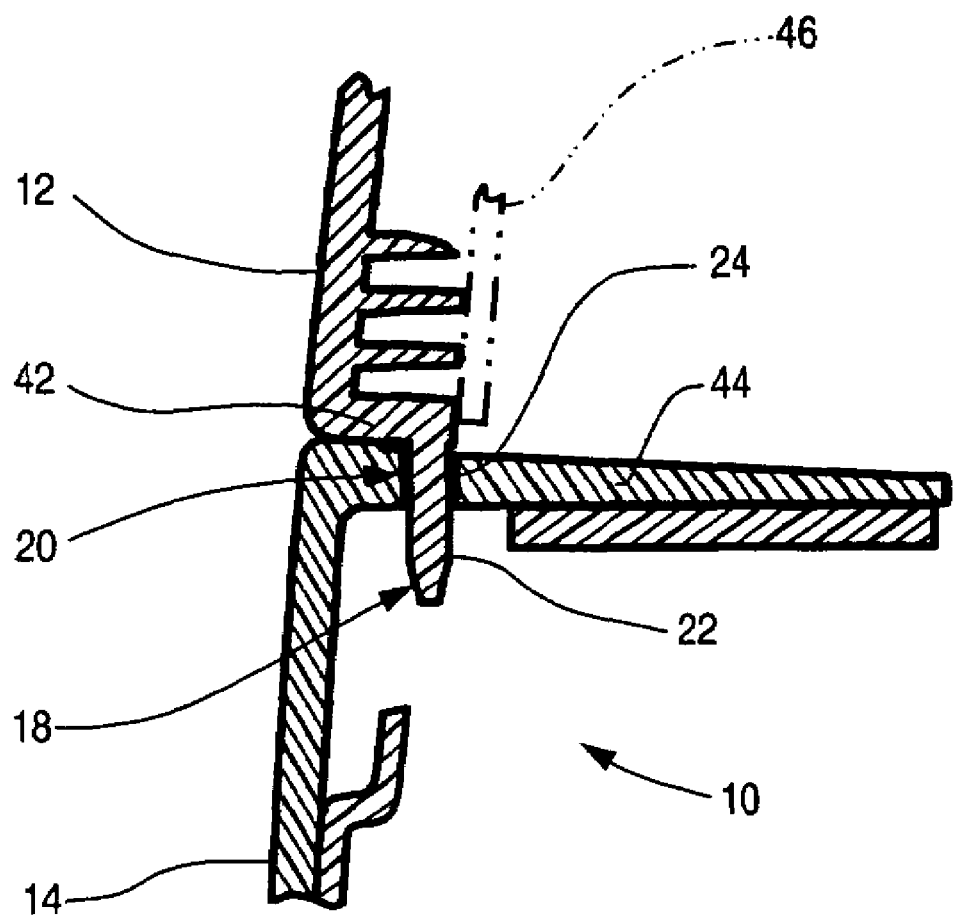
FIG. 5 is a cross-sectional view taken as shown in FIG. 4 of the first and second mating portions defined by a hook and slot coupling for interlocking engagement to hold the over-fender with respect to the fascia in at least two directions.

Referring now to FIGS. 4 and 5, the slot 24 can include an enlarged wide portion 28 and a narrowed portion 34 with a narrowing transition interposed therebetween. The hook 22 can include a protruding engagement barb or tab 40 and a support base or neck 38. The wide portion 28 of the slot 24 can be dimensioned to receive the protruding engagement barb or tab 40 of the hook 22. The narrow portion 34 of the slot 24 can be dimensioned to engage the support base or neck 38 and a portion of the protruding engagement barb or tab 40 to prevent movement of the hook 22 in two directions. The attachment joint 10 according to an embodiment of the present invention attaches the over-fender exterior body member 12 to the fascia exterior body member 14. The first exterior body member 12 can be formed as a plastic molded over-fender member with a first mating portion 18 molded integrally with the over-fender member. The second exterior body member 14 can be formed as a plastic molded fascia with a second mating portion molded integrally with the fascia. The first and second mating portions 18, 20 can include a hook 22 and slot 24 combination for defining a hook and slot coupling located between the first and second member 12, 14 for interlocking engagement with one another. It should be recognized that the hook 22 can be formed as the first mating portion or the second mating portion as desired, provided the slot 24 is formed as the other mating portion.

During installation, the fascia is initially located with the hook 22 interacting with the wide portion 28 of the slot 24 and slides in a forward to aft direction through the narrowing transition 32. This forward to aft movement engages the hook feature properly with respect to the narrowed portion 34 of the slot 24 lockingly engaging the first and second exterior body member 12, 14 in a cross-vehicle direction and in an up-down vertical direction perpendicular to the cross-vehicle direction. The forward to aft movement creates an interlocking engagement by positive attachment between the over-fender 12 and the fascia 14. Any possible movement in a third direction, normal to the other two directions, is restricted by connections between a third fender member 46 and the over-fender member 12, and between the third fender member 46 and the fascia member 14. The assembly can provide a consistent fit and finish appearance to gaps that are coplanar between the fender, over-fender, and fascia members. The hook 24 can be integrally molded with either the over-fender 12 or fascia 14 and helps to locate the other member in an easily assembled operation. The attachment joint aids in meeting fit and finish requirements on connections between exterior body members of a motor vehicle. Fit and finish issues between a front portion of the over fender and a rear portion of the fascia are addressed by locking the front portion of the over-fender into the rear portion of the fascia in order to provide proper coplanar gaps between the over-fender and the fascia. The attachment joint can reduce any adjustments required during assembly to meet fit and finish target values, and can in turn reduce assembly cycle time for the components. Integrally molded hook and slot features can eliminate the requirement of additional parts or fasteners for the assembly. The present invention can provide a robust design for achieving better fit and finish product results. Automotive customers desire to see smaller or zero gap tolerances between the parts on vehicles being purchased. The attachment joint according to an embodiment of the present invention can help achieve higher sales providing attractive appearances between external parts and uniform gaps within fit and finish tolerance values.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An attachment joint for controlling fit and finish of a connection between exterior body members of a motor vehicle comprising:

a first mating portion located on a first member;

a second mating portion located on a second member, wherein the first and second mating portions define a hook and slot coupling located between the first member and the second member for interlocking engagement with one another for holding the first member with respect to the second member in at least two directions; and a third member connectible to the first member and the second member to lock the first and second mating portions in a third direction, wherein the hook and slot coupling includes an elongate slot having a continuous perimeter at least partially defined by a wide portion adjacent one end of the slot and a narrow portion adjacent an opposite end of the slot, wherein the hook and slot coupling includes a hook having an engagement barb spaced adjacent an end of an outwardly extending support base, the engagement barb of the hook is sufficiently small to be inserted through the wide portion of the slot in a direction perpendicular to the slot, while being sufficiently large to prevent disengagement of the barb from the slot when located within the narrow portion of the slot, and wherein the second member includes an alignment pin and the third member includes an alignment aperture configured and arranged to receive the pin.

2. The attachment joint of claim 1, wherein the first member is an over fender member.

3. The attachment joint of claim 1, wherein the second member is a fascia member.

4. The attachment joint of claim 1, wherein the at least two directions are a cross-car direction and an up-down direction with respect to a motor vehicle.

5. The attachment joint of claim 1, wherein the first member is a plastic molded over fender member and the first mating portion is molded integrally with the over fender member.

6. The attachment joint of claim 1, wherein the second member is a plastic molded fascia and the second mating portion is molded integrally with the fascia member.

7. The attachment joint of claim 1, wherein the third direction is a fore-aft direction with respect to a motor vehicle.

8. The attachment of claim 1, wherein the support base of the hook is dimensioned to engage opposite sides of the narrow portion of the slot, while the hook is located within the narrow portion of the slot to prevent relative movement between the first and second members in two directions.

9. The attachment joint of claim 1, wherein the alignment pin projects from the second member in a direction parallel to a length of the slot.

10. The attachment joint of claim 1, wherein a length of the support base extending until a beginning of the engagement barb corresponds to a depth of the slot.

11. The attachment joint of claim 1, wherein a narrowest part of the slot is at least as wide as the support base of the hook.

12. The attachment joint of claim 1, wherein the narrow portion adjacent the opposite end of the slot is at least as narrow as every other portion of the slot.

* * * * *